Mar. 20, 1923.

W. MOELLER.
CALCULATING MACHINE.
FILED MAY 13, 1921.

INVENTOR
William Moeller
BY
Ralph S. Warfield
ATTORNEY

Mar. 20, 1923.
W. MOELLER.
CALCULATING MACHINE.
FILED MAY 13, 1921.
1,448,809.
3 SHEETS—SHEET 2.
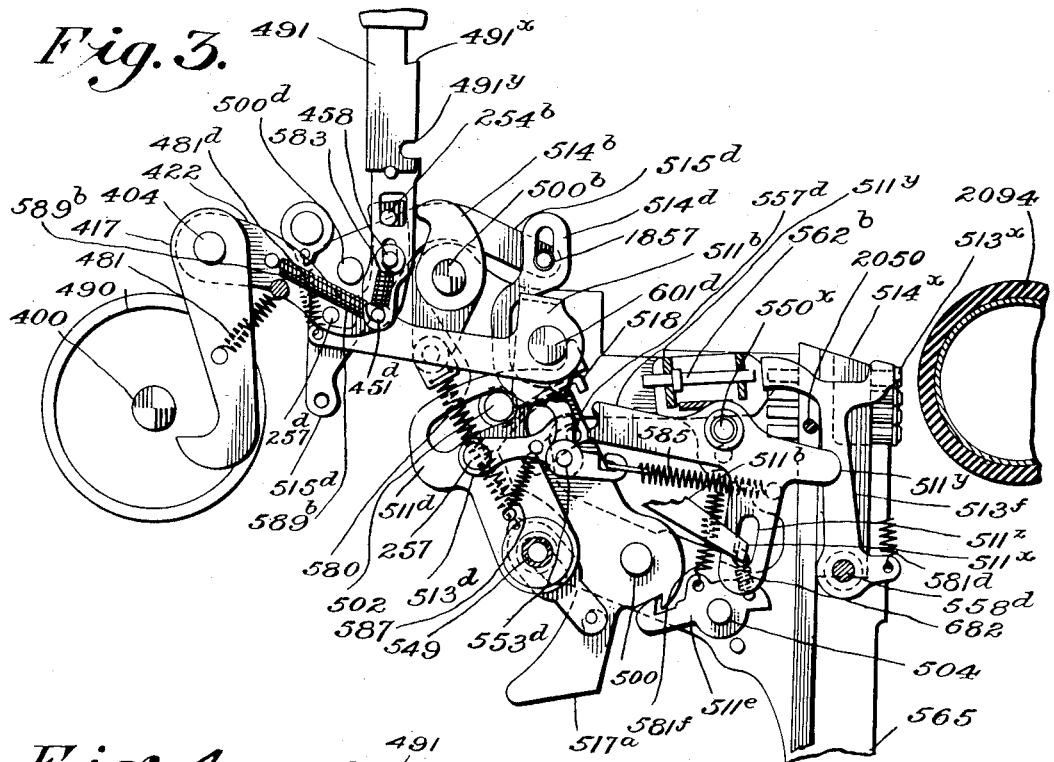
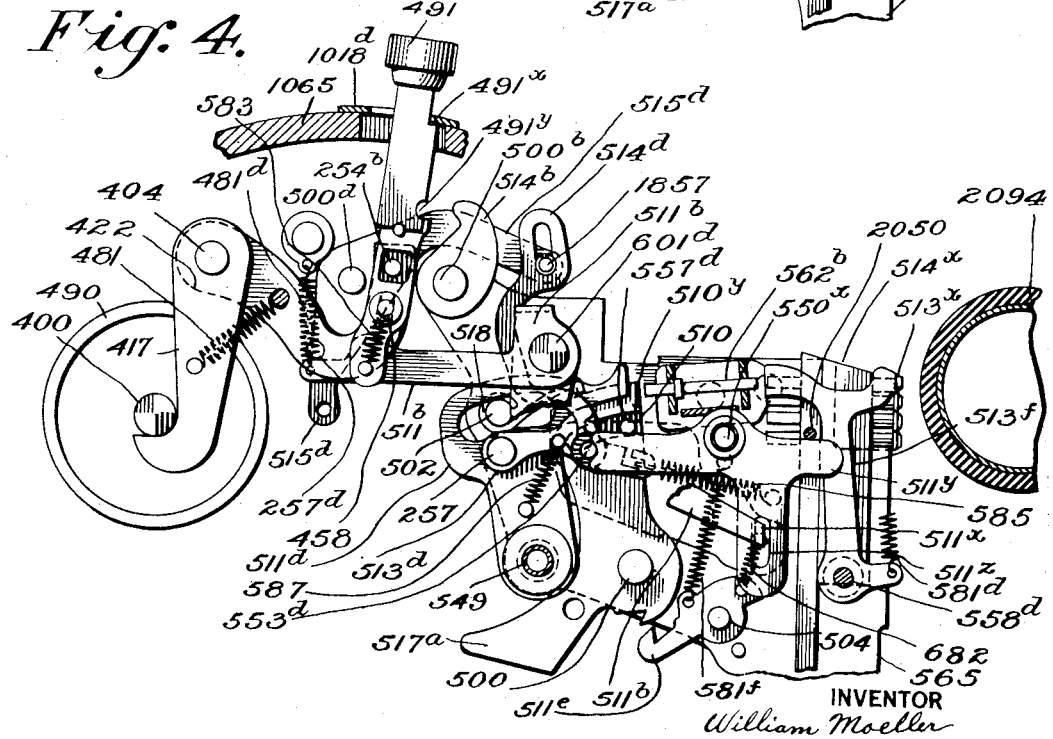
INVENTOR
William Moeller
BY
Ralph S. Warfield
ATTORNEY

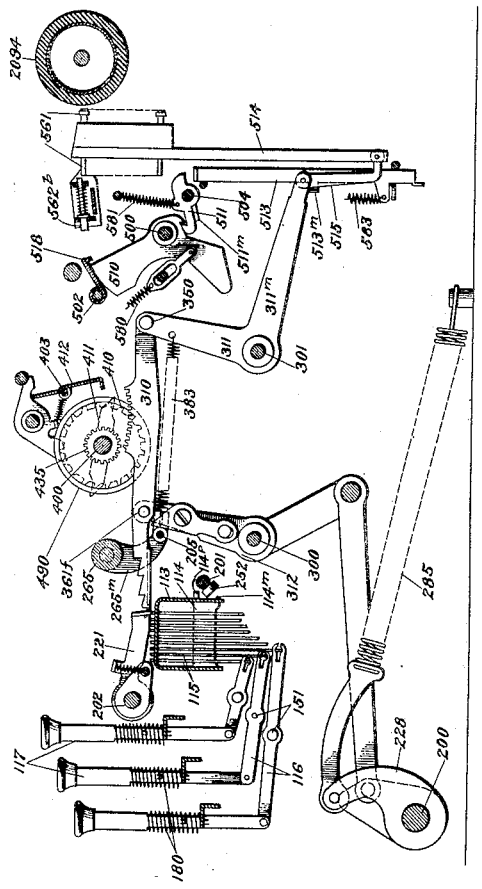

Patented Mar. 20, 1923.

1,448,809

UNITED STATES PATENT OFFICE.

WILLIAM MOELLER, OF DORRANCETON BOROUGH, PENNSYLVANIA, ASSIGNOR TO WALES ADDING MACHINE COMPANY, OF WILKES-BARRE, PENNSYLVANIA, A CORPORATION OF PENNSYLVANIA.

CALCULATING MACHINE.

Application filed May 13, 1921. Serial No. 469,092.

*To all whom it may concern:*

Be it known that I, WILLIAM MOELLER, a citizen of the United States, residing in the borough of Dorranceton, Luzerne County, Pennsylvania, have invented new and useful Improvements in Calculating Machines, of which the following is a specification.

More specifically, this invention relates to means to prevent the printing of signs under certain operating conditions of calculating machines, and in the present instance, I have chosen to illustrate one form of the invention as applied to the clear sign printing mechanism and controlled by the non-add mechanism, whereby to prevent the imprint of the clear sign designating the first item printed after the accumulating mechanism has been cleared, when such first item or items are non-added.

A clear sign should be printed with the first item which is accumulated and printed, irrespective of the number of items printed and not accumulated intermediate a clearing operation and the printing of the first accumulated item thereafter.

The invention finds its greatest utility in listing designating items and amounts, as in listing car numbers and weights, check numbers and amounts or what not, wherein the vertical list of designating numbers which are not to be accumulated, parallels the vertical list of amounts which are to be accumulated, it being customary to list the designating number in one column, tabulate the carriage to the amount column, and list the corresponding amount on the same horizontal line with its designating number, after which the paper is line spaced and the carriage returned to the right to bring the column for designating numbers to the printing point opposite the types, whereupon the foregoing operation is repeated.

A list of designating numbers and amounts printed on a Wales machine equipped with the usual clear and non-add sign printing mechanisms would appear as follows:

| Non-added designating numbers. | Accumulated amounts. |
|---|---|
| 1252◁⊙ | 75.48 |
| 1253◁ | 92.36 |
| 1254◁ | 67.50 |

Also in listing clerks' numbers and sales, the designating number which is not ac- cumulated, may be printed at the head of a column of sales, followed by an itemized list of sales and a slip bearing such memoranda would heretofore appear as follows:

.72◁⊙
8.92
6.50
4.33
19.75  (total)
.73◁⊙
.45
.83
.21
1.49  (total)

It will be noted that in each instance, the clear sign which is arranged to print with the first item printed after the accumulating mechanism has been cleared, is located adjacent the first non-accumulated designating number, which in these examples, is the first printed number.

An objection to this is that the first accumulated amount is not accompanied by a clear sign to indicate that the machine was clear before such amount was accumulated, and the location of the clear sign opposite the first non-accumulated designating number is without significance as it is immaterial, in listing such number, whether or not the accumulating mechanism was clear at that time.

One object attained by the present invention in this particular adaptation is to insure the location of the clear sign opposite the imprint of the first item added after the accumulating mechanism has been cleared, regardless of the number of non-added items listed intermediate such clearing operation and the listing of the first added item.

Other objects are to enable the operator to restrain or prevent the automatic printing of a sign, at will, and to effect such restraint without disabling the sign printing mechanism in such manner as to require a further setting operation to restore it to its potentially effective condition.

Another object is to enable the operator to, in effect, print one sign indicating that an item was listed while the machine was operated under one condition or adjustment, in place of another sign which indicates that an item was listed while the machine was operated under a different condition or adjustment, such last named sign being potentially operative, and ordinarily printed in the usual operation of the machine.

To these and other ends, my invention includes certain novel features and combinations, all of which will be more fully set forth hereinafter and particularly pointed out in the claims.

In the accompanying drawings, Fig. 1 is a detail sectional view of a part of the well-known Wales calculating machine, showing the non-add and the clear sign printing mechanisms in their normal idle positions;

Fig. 3 is a detail showing in side elevation, the non-add mechanism and clear sign printing mechanism, the latter in cocked or potentially operative position;

Figure 1:
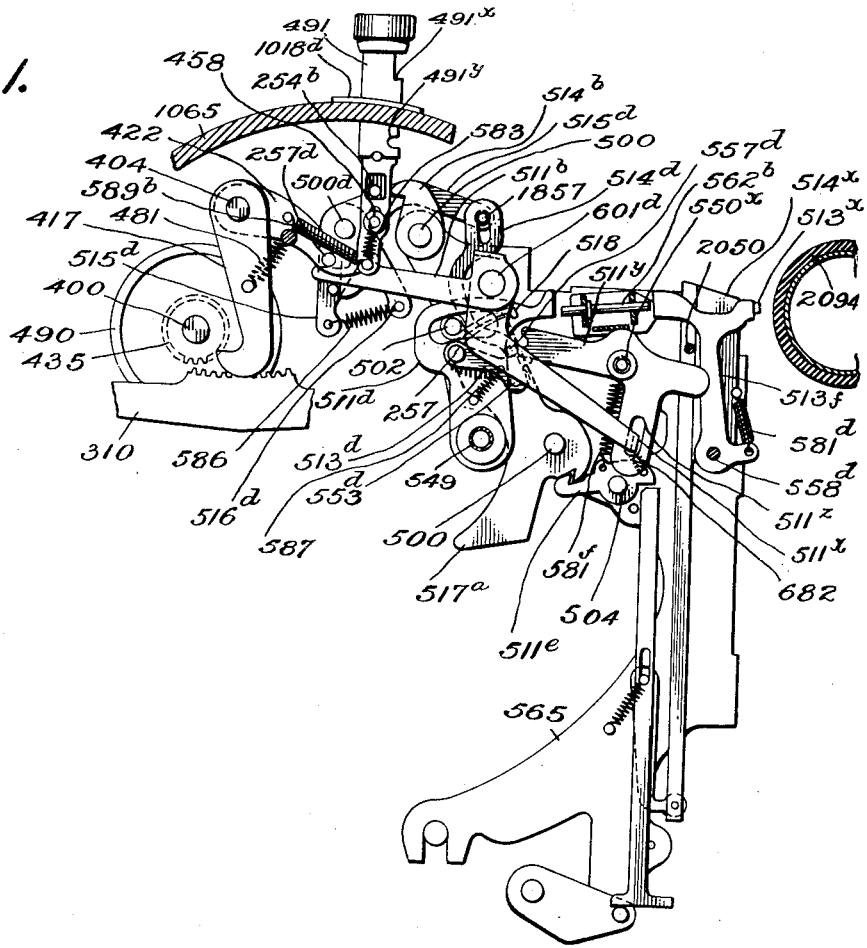

Fig. 4 is a similar view, showing the non-add mechanism in operated position, the hammer having been released to print the non-add sign, the non-add mechanism being effective to restrain the clear sign printing mechanism against operation, and Fig. 5 is a detail longitudinal sectional view through a machine of the well-known Wales type, illustrating the association of the keyboard, accumulating and regular printing mechanism.

I have chosen to illustrate one embodiment of my invention as applied to the well-known Wales calculating machine, disclosed in U. S. patents to Wales #794.205, July 11, 1905; #797,032, August 15, 1905; and #940,758, November 23, 1909. Bickford #1,112,516, October 6, 1914; and Pentecost #1,302,965, May 6, 1919, to which reference is made for a more complete understanding of the various mechanisms involved.

In the Wales machine, the denominational adding wheels or counters 490 are independently journaled on a numeral wheel axle 400, located above and extending across a denominational series of adding racks or drive members 310. Each counter is provided with a pinion 435, to engage and disengage from its corresponding adding rack 310 the axle 400, and consequently the counters 490 and pinions 435, being normally sustained at such a distance above the racks 310 as to retain the pinions out of engagement with their corresponding denominational adding racks or drive members 310.

In accumulating operations, the racks 310 advance predetermined distances according to the item to be registered, while the counters 490 remain idle. After the racks have reached their various advanced positions, the numeral wheel axle 400 with its counters 490 drops to engage the pinions 435 with the racks, after which the racks restore to their home positions, and in so doing, turn the counters through various angular distances corresponding to the distances through which the racks have just previously advanced, to register the desired item on the counters.

After the racks arrive at their home positions, the axle 400 is raised to disengage the counters 490 and pinions 435 from the racks.

Front arms 312, and rear arms 311 support the adding racks 310, the front supporting arms being journaled on a cross shaft 300 and the rear supporting arms being journaled on a cross rod 301.

Each denominational rear supporting arm 311 is equipped with a rearward extension 311$^m$ connected by a link 515, with a typecarrier 514, the head of which carries a line of types 561 corresponding with the keys 117 in the respective denominational rows.

The racks or drive members 310 when advanced by the drive springs 383, position the typecarriers 514 to bring the types 561 corresponding to the depressed keys 117, to the printing line of a platen 2094.

Printing occurs after the types have been positioned at the printing line. A universal detent 518 (Figs. 1 and 3) mounted on an oscillatory shaft 502 normally locks the denominational printing hammers 510 in cocked or set position. Individual dogs 511 also retain the respective printing hammers in cocked or set position, the dogs operating in the usual manner to release the hammers to print the types corresponding to the item set up on the keyboard, and restraining the hammers to the left of the highest digit of the item, when the universal detent 518 is released.

The printing hammers drive slidably mounted firing pins or plungers 562$^b$ against the type stems which are at the printing line, to impress the types on the work sheet carried by the platen.

Sometimes it is desired to print a number without adding or registering it on the counters. Obviously, to effect such result, it is only necessary to prevent the engagement of the counters or adding wheels 490 with their drive members or adding racks 310.

This may be accomplished, as shown in patent to McFarland #1,024,013, April 23, 1912, by means of a key 491 having a pin and slot connection 458 with a crank 422 fast on a suitably journaled shaft 404. A spring 583 normally holds the key 491 in its uppermost position with the lower end wall of the slot against the pin 458. Hooks or detaining members 417 fixed on the shaft 404, normally lie in idle position relatively to the axle 400 on which the numeral wheels or counters 490 are journaled, as shown in Figs. 1 and 3, but depression of the key 491, when the counter axle 400 is in its normal elevated position, rocks the shaft 404 against the tension of a retracting spring 481, to swing the non-add hooks 417 under the numeral wheel axle 400 to hold the numeral wheels or their pinions 435 out of engagement with their racks 310.

The stem of key 491 projects outwardly through an aperture in the usual case 1065 (see Fig. 4) and through a guide slot in an escutcheon plate 1018ᵈ covering the aperture in the casing.

The stem of the key 491 is provided with a notch 491ʸ adapted to accommodate the lip of a cam 514ᵇ fast on a shaft 500ᵇ rocked at each operation of the machine.

Depression of the key 491 registers the notch 491ʸ with the lip of the cam 514ᵇ after which the key can be rocked rearwardly on its stud 458 to fit the notch over the lip of the cam, to hold the key depressed.

The key is further equipped with a shoulder 491ˣ which, upon depression of the key, is brought to a plane beneath the lower surface of the escutcheon plate 1018ᵈ, and when the key is rocked to fit the notch 491ʸ over the lip of the cam 514ᵇ, the shoulder 491ˣ is brought beneath the escutcheon plate. A spring 589ᵇ yieldingly maintains the key in its rearwardly adjusted position.

Upon operating the machine, the shaft 500 rocks the cam 514ᵇ rearwardly, releasing the key 491 to the action of its spring 583, which partially restores the key, but its action is arrested by contact of the shoulder 491ˣ with the escutcheon plate 1018ᵇ before the retracting spring 481 can withdraw the retaining hooks 417 to release the counter axle 400, as shown in Fig. 4.

The partial restoration of the key 491 positions an unnotched portion of the key stem opposite the cam 514ᵇ, and when the operation of the machine is about completed, the lip of the cam 514ᵇ on its return, contacts such unnotched portion and rocks the key 491 to disengage the shoulder 491ˣ from the escutcheon plate. This frees the key 491 and retaining hooks 417 to the action of the retracting spring 481 which shifts the hooks to their ineffective or idle positions, and restores the key to its normal position.

The non-add mechanism has no effect on the printing, which occurs just as if the number had been accumulated on the counters.

Figure 2:
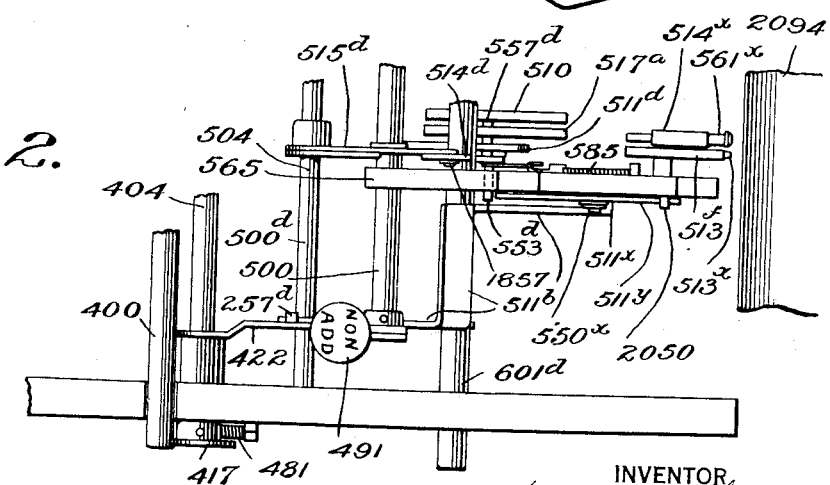
Fig. 2 is a fragmentary top plan view, of the non-add key and its connected parts.

It is desirable to print a sign indicating that the designating or other non-added item, has not been accumulated, to which end, the Wales machine has been equipped with a sign typecarrier 514ˣ similar to the regular typecarriers 514, Fig. 5, but provided with special sign printing types in place of the usual digit or numeral printing types. The non-add sign printing type 561ˣ (Fig. 2) is located at the upper end of the typecarrier 514ˣ and normally lies at the printing line on the platen.

A special sign printing hammer 517ᵃ journaled on the hammer shaft 500 and driven by a spring 580, (Fig. 3) operates against one of the usual firing pins 562ᵇ to impress the non-add sign type 561ˣ on the work sheet.

The hammer 517ᵃ is cocked by the usual hammer resetting mechanism, not shown, and is held in cocked position by the universal detent 518 fast on the shaft 502 which oscillates at each operation of the machine. In addition, an individual hammer dog 511ᵉ journaled on a cross rod 504, engages the heel of the special sign printing hammer 517ᵃ to restrain the latter from firing except when the imprint of a special sign is desired. A light spring 581ᶠ maintains the dog in its effective position.

Obviously, since the universal detent 518 releases the sign printing hammer 517ᵃ at each operation, it is only necessary to displace the individual dog 511ᵉ in order to effect sign printing. Depression of the non-add key 491 depresses the crank 422, which carries a stud 257ᵈ overlying the forwardly projecting arm of a releasing bail lever 511ᵇ journaled on a cross rod 601ᵈ. The stud 257ᵈ, by contact with the forwardly projecting arm of the releasing bail lever 511ᵇ, rocks the latter downwardly and consequently causes the rearwardly projecting arm of the bail lever to swing upwardly. A spring 682 connects the rearwardly projecting arm of the bail lever 511ᵇ and the tail of the individual dog 511ᵉ, and as the rearwardly projecting arm 511ᵇ swings upwardly, it tensions spring 682 to overcome spring 581ᶠ and withdraw the dog 511ᵉ to ineffective position, so that the special sign printing hammer 517ᵃ is restrained in cocked position only by the universal detent 518.

Upon operation of the machine, the detent 518 is lifted, releasing the sign printing hammer 517ᵃ to print the non-add sign.

It is customary in Wales machines, to provide means whereby the first item printed after the counters have been cleared may be designated by a "clear signal" to indicate that the machine was clear prior to the entry of such first item.

One such mechanism is set forth in U. S. patent to Wales #940,758, November 23, 1909 to which reference is made for a more complete disclosure than that which follows.

Referring to the accompanying drawings, the clear sign type 513ˣ is mounted on one end of the cross piece of a T-shaped lever 513ᶠ, the stem of which is suitably pivoted at 558ᵈ, a spring 581ᵈ normally holding the type and lever withdrawn from the printing line on the platen.

Type impressions of the clear sign are effected by the impact of a clear sign printing hammer 511ᵈ against a firing pin 562ᵇ which strikes the opposite end of the cross piece 513ᶠ from that carrying the sign type 513ˣ.

The clear sign printing hammer 511$^d$ is journaled on a bushing 549 fast in the right hand printer side frame 565, and normally lies in its discharged or fired position, shown in Fig. 1. During the operation of taking a total and clearing the counters, mechanism set forth in patent to Wales #940,758, above mentioned, operates to rock a shaft 500$^d$ equipped with a crank 516$^d$ (Fig. 1). A spring 586 connects the crank 516$^d$ with one arm of a lifting lever 515$^d$, the opposite longer arm of which carries a pin 1857 entered in a slot in the upper end of a lifting link 514$^d$. The lower end of the lifting link is pivotally connected by a stud 553$^d$ to a latch 513$^d$ pivoted at 257 to the clear sign printing hammer 511$^d$.

The units printing hammer 510 (Fig. 2) carries a laterally projecting clear sign hammer setting stud 557$^d$ with which the latch 513$^d$ coacts when the clear sign printing hammer 511$^d$ is to be set or cocked.

Normally the rear arm of the lifting lever 515$^d$ lies in its lowered position (shown in Fig. 1) the upper end wall of the slot in the link 514$^d$ resting upon the pin 1857, and the hammer cocking latch 513$^d$ lying in its lowered idle position to which it is drawn by its spring 587, out of the path of the resetting stud 557$^d$.

During a clearing operation, the rock shaft 500$^d$ oscillates, swinging the crank 516$^d$ and tensioning the spring 586, linking the crank with the shorter arm of the lever 515$^d$, to rock the lever and raise the longer arm thereof, together with the lifting link 514$^d$ and the latch 513$^d$ until the recessed free end of the latch lies in the path of the cocking stud 557$^d$ carried by the units printing hammer 510. The latch 513$^d$ is positioned prior to the resetting of the units printing hammer, which latter, as it is restored to cocked position, presses the cocking stud 557$^d$ against the latch 513$^d$ to force the latter forwardly and swing the clear sign printing hammer 511$^d$ to its cocked or potentially operative position (shown in Fig. 3) against the tension of its drive spring 585, one end of which may be conveniently connected to the same stud 553$^d$ which connects the lifting link 514$^d$ to the latch 513$^d$.

At the conclusion of the clearing operation, the rock shaft 500$^d$ returns to its normal position, thereby relaxing the spring 586 to permit the lifting lever 515$^d$ to restore to idle position with its pin 1857 at the lower end of the slot in the lifting link 514$^d$. This enables the link 514$^d$ and latch 513$^d$ to drop to idle position under the influence of the spring 587 after the release of the latch by the cocking stud 557$^d$.

Such release of the latch 513$^d$ does not occur until the first item is printed after the clearing operation.

Obviously, so long as the stud 557$^d$ of the units printing hammer 510 maintains its engagement with the latch 513$^d$, the clear sign printing hammer 511$^d$ is held in cocked position, regardless of the number of idle or non-printing operations of the machine, succeeding a clearing operation, but as the units printing hammer fires in printing the first item after a clearing operation, the spring 585 draws the clear sign printing hammer 511$^d$ rearwardly against the appropriate firing pin 562$^b$, which drives the clear sign type carrying lever 513$^f$ towards the platen 2094 to impress the clear sign on the work sheet adjacent to the printed item.

The cocking stud 557$^d$ has a longer path of travel than the latch 513$^d$ of the clear sign printing hammer, and consequently, withdraws from the latch to enable the spring 587 to displace the latch from the path of the cocking stud, the position of the lifting pin 1857 at the lower end of the slot in the lifting link 514$^d$ permitting such displacement of the latch, whereby to prevent recocking of the clear sign printing hammer until the mechanism is reset during a clearing operation.

The sign printing hammer 517$^a$ has an arcuate slot 510$^y$ (Fig. 4) which embraces the cocking stud 557$^d$ to enable the hammer 517$^a$ to operate while the cocking stud maintains the clear sign printing hammer 511$^d$ cocked.

The foregoing is old in the art and constitutes a part of the present invention only in so far as it cooperates with the novel features explained hereinafter.

As hereinbefore stated, it is frequently desired in various classes of work, to print a designating number, as a clerk's number, check number, car number or the like, prior to entering an amount identified by or associated with such designating number, on the accumulator. The designating number is not registered on the counters 490, but ordinarily the clear sign would be printed alongside such non-added designating number as an incident to the first operation of the units printing hammer after a clearing operation.

The embodiment of my invention illustrated in the drawings is directed to means to prevent the printing of the clear sign 513$^x$ with the first and succeeding numbers printed after a clearing operation, providing such numbers are non-added, the mechanism permitting the printing of the clear sign only with the first amount accumulated on the counters and printed, after a clearing operation.

It will be understood, however, that my invention is susceptible of other applications than that herein set forth.

As a convenient means controllable by the non-add key 491 to effect this result, I arrange to restrain the clear sign printing hammer 511$^d$ against operation, and further, to maintain such hammer in cocked or set position so that it may function at the proper time and thus avoid the necessity of resetting the hammer.

The rearwardly projecting arm of the releasing bail lever 511$^b$ carries a lateral projection or lip 511$^x$ entered in a slot 511$^z$ formed in a depending, offset arm of an arresting lever 511$^y$ pivoted on a stud 550$^x$ and having a forwardly projecting arm shiftable into and out of the path of the stud 553$^d$ which connects the lifting link 514$^d$ and the latch 513$^d$.

Assuming that the clear sign printing hammer 511$^d$ is in cocked position, depression of the non-add key 491 will rock the releasing bail lever 511$^b$, as above explained, causing the projecting lip 511$^x$ to traverse the slot 511$^z$ in the offset arm of the arresting lever 511$^y$ until it contacts the upper end wall of the slot and swings the recessed end of the forward arm of the arresting lever 511$^y$ into the path of and closely adjacent to the stud 553$^d$. Locking the key 491 in depressed position retains the forward arm of the arresting lever 511$^y$ where adjusted.

Upon the ensuing operation of the machine, the individual dogs (similar to the special sign printing hammer dog 511$^e$) release the regular or digit printing hammers 510 corresponding with the denominations of the digits composing the designating number to be printed, but not accumulated, and the universal detent 518 is displaced to free the regular hammers, including the units hammer 510 and the special sign printing hammer 517$^a$ for operation.

The units hammer 510 (Fig. 2) which carries the clear sign hammer resetting stud 557$^d$ withdraws from the resetting latch 513$^d$, thereby freeing the clear sign printing hammer 511$^d$ for operation were it not for the presence of the arresting member 511$^y$ in the path of the stud 553$^d$, which prevents the operation of the clear sign printing hammer and retains it in cocked position until the resetting stud 557$^d$ on the units printing hammer is restored by the cocking of such units hammer, to its normal position. The resetting stud 557$^d$, as it returns with its hammer 510, again contacts with latch 513$^d$ and restores the clear sign printing hammer 511$^d$ to its fully cocked position, thereby removing the connecting stud 553$^d$ from its seat in the recessed end of the arresting member 511$^y$ to permit the latter to drop back to idle position as the non-add key 491 is released by its cam 514$^b$ and springs upwardly to its normal undepressed position.

The recessed end of the arresting member 511$^y$ serves to prevent the accidental displacement of the latch 513$^d$ during the temporary withdrawal of the resetting pin 557$^d$, the arresting member being held against shifting to idle position, by the contact of the lip 511$^x$ of the bail lever 511$^b$ with the upper end of the slot 511$^z$, and against shifting past its effective position, by contact of the tail of the arresting member with a suitable abutment or stop 2050 on the printer frame of the machine.

It will be understood that although the arresting member 511$^y$ drops back to idle position after each non-add operation, providing the non-add key is not intentionally held depressed, it will be restored to operative position upon each depression of the non-add key, even after the clear sign printing hammer 511$^d$ has been fired with the first amount accumulated and printed after a clearing operation.

It will be remembered that the clear sign printing hammer 511$^d$ normally remains in its discharged position and that the resetting latch 513$^d$ and its stud 553$^d$ are normally lowered, so that although the arresting member 511$^y$ shifts to operative position at each depression of the non-add key 491, it does not become effective unless the clear sign printing hammer is cocked.

Obviously, the non-add mechanism will adjust the arresting member 511$^y$ to effective position irrespective of the means which may be employed to set the non-add mechanism.

Changes may be made in the form and arrangement of the several parts set forth and the idea is capable of various other applications without departing from the spirit and scope of this invention.

What I claim as new is—

1. In a calculating machine, the combination with accumulating mechanism; printing mechanism; sign-printing mechanism to normally print a sign to designate the first item printed after the accumulating mechanism is cleared; and non-add means operable to prevent the registration of numbers on the accumulating mechanism while permitting the printing mechanism to print such numbers; of means operable as an incident to the operation of the non-add means to prevent the operaton of the clear sign printing mechanism.

2. In a calculating machine, the combination with accumulating and printing mechanisms; sign printing mechanism to automatically print a sign to designate the first item printed after the accumulating mechanism has been cleared, such sign printing mechanism including a hammer; and non-add mechanism to prevent the registration of numbers on the accumulating mechanism regardless of the printing mechanism; of means controlled by the non-add mechanism, to prevent the printing of the sign with the first item printed after the accumulating mechanism has been cleared, including means shiftable into the path of the sign printing hammer to prevent its operation.

3. In a calculating machine, the combination with accumulating and printing mechanisms; clear sign printing mechanism to automatically print a sign to designate the first item printed after the accumulating mechanism has been cleared, such clear sign printing mechanism including a hammer; and non-add mechanism settable to prevent the registration of items on the accumulating mechanism; of non-add sign printing mechanism, including a hammer; normally effective locking means individual to said non-add sign printing hammer; means to prevent the printing of the clear sign to designate the first item printed after the accumulating mechanism has been cleared; and means controlled by the non-add mechanism to disable the normally effective locking means for the non-add sign printing hammer, and to shift to effective position the means for preventing the printing of the clear sign.

4. In a calculating machine, the combination with accumulating and printing mechanisms; sign printing mechanism to automatically print a sign to designate the first item printed after the accumulating mechanism has been cleared, such sign printing mechanism including a hammer; and non-add mechanism to prevent the registration of items on the accumulating mechanism; of a lever controlled by the non-add mechanism, and a normally idle arresting member shiftable by the lever to prevent the effective operation of the sign printing hammer.

5. In a calculating machine, the combination with accumulating and printing mechanisms; sign printing mechanism to automatically print a sign to designate the first item printed after the accumulating mechanism has been cleared, such sign printing mechanism including a hammer; and non-add mechanism to prevent the registration of items on the accumulating mechanism; of a lever controlled by the non-add mechanism, and a normally idle arresting member having an offset arm engaged by the lever to shift the arresting member to position to prevent the effective operation of the sign printing hammer.

6. In a calculating machine, the combination with accumulating and printing mechanisms; sign printing mechanism to automatically print a sign to designate the first item printed after the accumulating mechanism has been cleared, such sign printing mechanism including a hammer; and non-add mechanism to prevent the registration of items on the accumulating mechanism; of a lever controlled by the non-add mechanism; and a pivotally supported arresting member shiftable by the lever to prevent the effective operation of the sign printing hammer.

7. In a calculating machine, the combination with accumulating and printing mechanisms; sign printing mechanism to automatically print a sign to designate the first item printed after the accumulating mechanism has been cleared, such sign printing mechanism including a hammer; and non-add mechanism to prevent the registration of items on the accumulating mechanism; of a lever controlled by the non-add mechanism; and a pivotally supported arresting member having a slot formed therein and entered by said lever, to enable the lever to shift the arresting member to position to prevent the effective operation of the sign printing hammer.

8. In a calculating machine, the combination with accumulating and printing mechanisms; sign printing mechanism to automatically print a sign to designate the first item printed after the accumulating mechanism has been cleared, the sign printing mechanism including a normally discharged hammer; means controlled by the printing mechanism to cock the sign printing hammer and hold it in cocked position until the printing of the first item after a clearing operation; and non-add mechanism to prevent the registration of an item on the accumulating mechanism regardless of the printing of such item; of means controlled by the non-add mechanism to arrest the sign printing hammer against operation and maintain it in set position to be re-engaged by the cocking and holding means upon the restoration of the printing mechanism to normal position.

9. In a calculating machine, the combination with accumulating and regular printing mechanisms; sign printing mechanism to automatically print a sign to designate the first item printed after the accumulating mechanism has been cleared, the sign printing mechanism including a normally discharged hammer; means controlled by a denominational hammer of the regular printing mechanism to cock the sign printing hammer and retain it in cocked position as long as the denominational hammer remains cocked after the clearing operation, the sign printing hammer, normally adapted to operate with the denominational hammer to print the sign with the first item printed after a clearing operation; non-add mechanism to prevent the registration of items on the accumulating mechanism; and non-add sign printing mechanism independent of the clear sign printing mechanism; of means controlled by the non-add sign printing mechanism to restrain the clear sign printing mechanism from operation and permit the non-add sign printing mechanism to operate.

10. In a calculating machine, the combination with accumulating and printing mechanisms; and automatically operating sign printing mechanism; of a normally idle arresting member shiftable at will to effective position to prevent the operation of the sign printing mechanism.

11. In a calculating machine, the combination with accumulating and printing mechanisms; and sign printing mechanism to automatically print a sign to designate the first item printed after the accumulating mechanism has been cleared; of means under the control of the operator to prevent the operation of the sign printing mechanism when the accumulating mechanism is rendered inoperative, and to maintain the sign printing means potentially operative.

12. In a calculating machine, the combination with accumulating and printing mechanisms; separate sign printing mechanisms; one of which is adapted to print a sign to designate the first item printed after the accumulating mechanism is cleared; and means to control the printing of various signs by the remaining sign printing mechanism; of a device controlled by one of said last named means to prevent the operation of the clear sign printing mechanism.

13. In a calculating machine, the combination with accumulating and printing mechanisms; separate sign printing mechanisms, one of which is normally discharged and the other of which is normally potentially operative; means to clear the accumulating means; means controlled by the clearing means to set the normally discharged sign printing mechanism to potentially operative position; and means to control the printing of various signs by that sign printing mechanism which is normally potentially operative; of a device controlled by one of said last-named means to prevent the operation of the remaining sign printing mechanism and maintain it in potentially operative position.

14. In a calculating machine, the combination with accumulating and printing mechanisms; and separate sign printing mechanisms, each of which has a sign normally positioned at the printing line; of means to control the operation of one of said printing mechanisms, and to prevent the operation of the other of said sign printing mechanisms.

15. In a calculating machine, the combination with accumulating and printing mechanisms; and separate sign printing mechanisms, each of which has a sign normally positioned at the printing line; of means to control the operation of one of said sign printing mechanisms, and to prevent the operation of the other of said sign printing mechanisms and maintain such last-named sign printing mechanism in potentially operative position.

16. In a calculating machine, the combination with accumulating and printing mechanisms; and separate sign printing mechanisms; of means to control the operation of one of said sign printing mechanisms, and to prevent the operation of the other of said sign printing mechanisms.

17. In a calculating machine, the combination with accumulating and printing mechanisms; and independently operable sign printing mechanisms; of means to control the operation of one of said sign printing mechanisms and prevent the operation of the other sign printing mechanism.

WILLIAM MOELLER.